United States Patent [19]
Stull

[11] Patent Number: 5,632,831
[45] Date of Patent: May 27, 1997

[54] SYSTEM AND METHOD FOR CUTTING AND SPLICING POLYMERIC WEBS

[75] Inventor: Robert Stull, Douglassville, Pa.

[73] Assignee: Superpac, Inc., Southampton, Pa.

[21] Appl. No.: 286,005

[22] Filed: Aug. 4, 1994

[51] Int. Cl.$^6$ .................................................. B32B 31/18
[52] U.S. Cl. ...................... 156/73.3; 156/73.4; 156/159; 156/267
[58] Field of Search ................. 156/73.1, 73.3, 156/73.4, 157, 159, 267, 269, 502, 510, 515, 580.1, 580.2

[56] References Cited

U.S. PATENT DOCUMENTS

| | | | |
|---|---|---|---|
| 3,419,447 | 12/1968 | Hewitt | 156/73.3 |
| 3,657,033 | 4/1972 | Sager | 156/73.3 |
| 3,687,787 | 8/1972 | Grand | 156/507 |
| 3,821,048 | 6/1974 | Acker et al. | 156/73.4 |
| 3,854,357 | 12/1974 | Kron | 156/502 X |
| 4,490,199 | 12/1984 | Dunning | 156/73.4 |
| 4,566,922 | 1/1986 | Martinez | 156/64 |
| 4,605,578 | 8/1986 | Emrich et al. | 428/57 |
| 4,610,750 | 9/1986 | Mango | 156/510 |
| 4,693,771 | 9/1987 | Payet et al. | 156/73.3 |
| 4,713,131 | 12/1987 | Obeda | 156/73.1 |
| 4,750,970 | 6/1988 | Malosh | 156/580.1 |
| 4,935,081 | 6/1990 | Becking | 156/157 |
| 5,061,331 | 10/1991 | Gute | 156/64 |
| 5,085,719 | 2/1992 | Eck | 156/73.4 |
| 5,223,070 | 6/1993 | Tsubone | 156/353 |

*Primary Examiner*—James Sells
*Attorney, Agent, or Firm*—Woodcock, Washburn Kurtz Mackiewicz & Norris

[57] ABSTRACT

An apparatus for forming a near-seamless splice between a first polymeric web portion and a second polymeric web portion includes a frame, a clamping mechanism for clamping the first polymeric web portion and the second polymeric web portion in a desired position of registration, a combined welding and cutting mechanism for simultaneously (a) welding the two web portions together by forming a weld line at which the two web portions are fused; and (b) cutting through the two web portions at the weld line. This creates a near-seamless splice between the two web portions. In another aspect of the invention, the apparatus is mounted on a portable carriage that permits a user to quickly and easily move the entire apparatus into and out of position on a production line. The invention has particular utility for removing defective portions from a printed polymeric web having a repeating pattern thereon, such as the wrapping that is used for packaging absorbent consumer paper products such as paper towels and napkins.

10 Claims, 6 Drawing Sheets

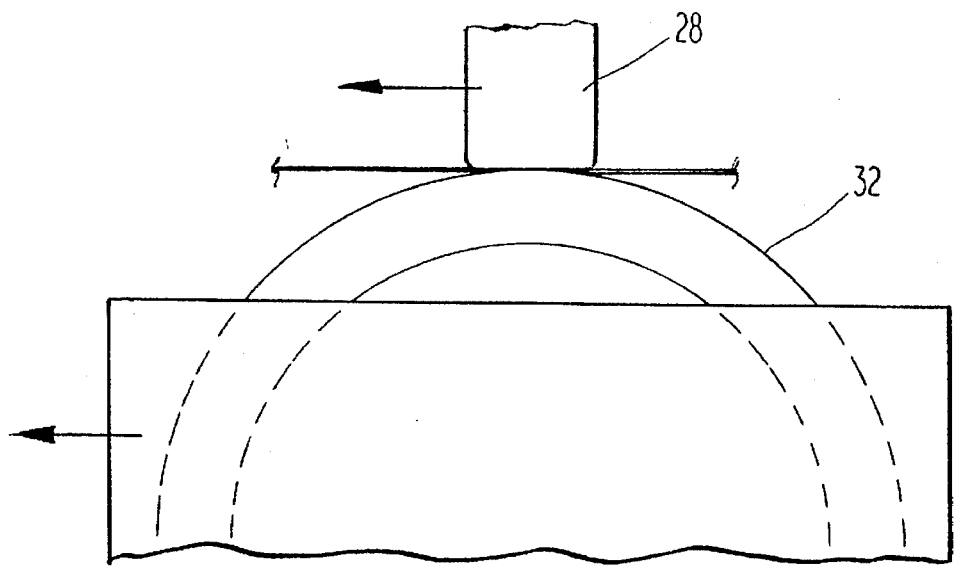
*Fig. 4*
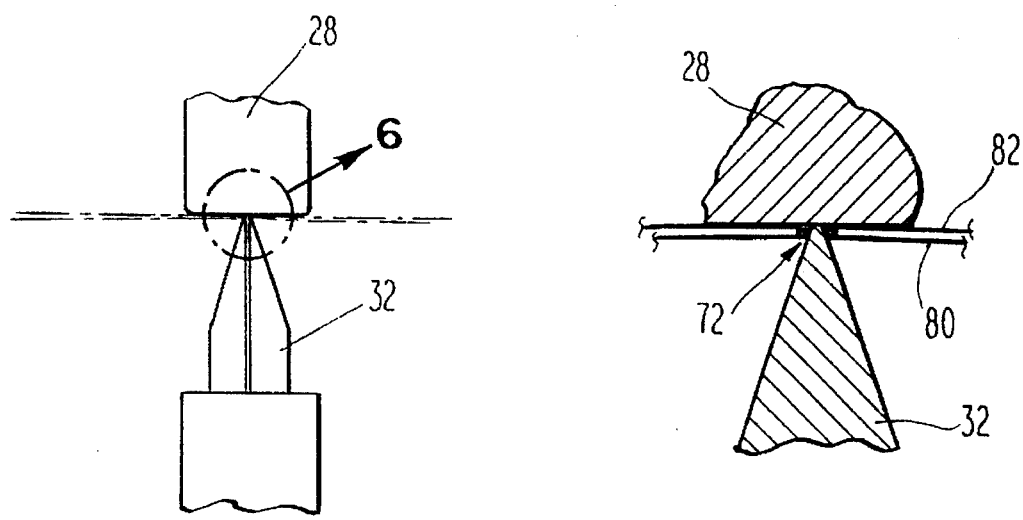
*Fig. 5*  *Fig. 6*

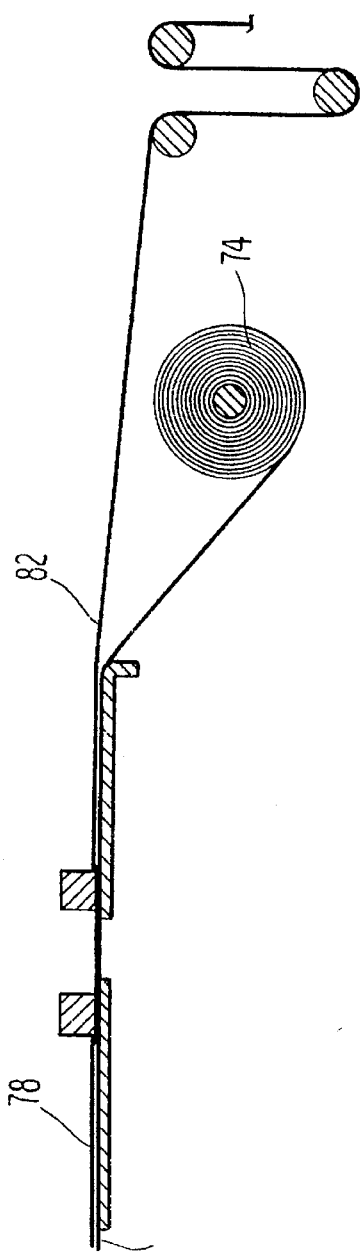
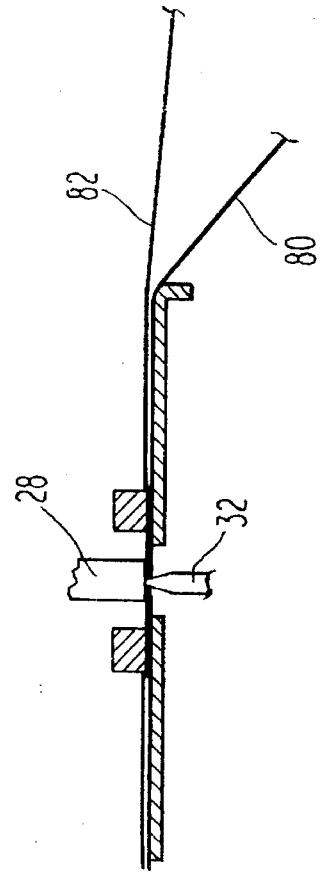
Fig. 7D
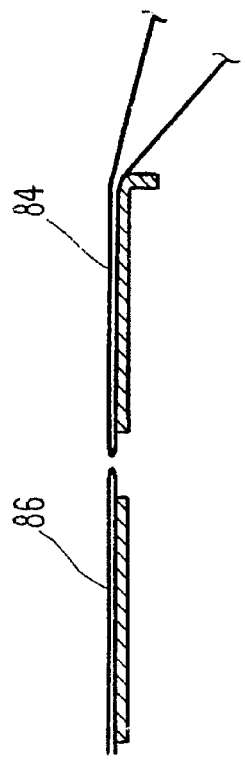
Fig. 7E
Fig. 7C

SYSTEM AND METHOD FOR CUTTING AND SPLICING POLYMERIC WEBS

BACKGROUND OF THE INVENTION

1. Field of the Invention

This invention pertains, in general, to quality control in the manufacture of printed polymeric webs, such as which are used for packaging consumer products such as paper towels and napkins. More specifically, this invention provides an improved method and apparatus for removing defective areas from such a web, and for repairing the web in a near-seamless manner after a defective area has been removed.

2. Description of the Prior Art

Polymeric packaging material for consumer products such as absorbent paper towels is manufactured as a long web of polymeric material that has a repeating pattern printed thereon. The long web is delivered in roll form to a customer, which uses automatic packaging machinery to sever the web at regular intervals corresponding to the repeating pattern in order to wrap each product. In order to prevent misalignment within the automatic wrapping process, it is important that the pattern be spaced at regular intervals throughout the entire length of the web.

Typically, a manufacturer of the printed packaging material will inspect each web carefully for defects before shipping the web to a customer. When a defective area is found, it is cut out of the web, and the two remaining ends are taped or sliced together. The spliced area usually has an unacceptable appearance. It is common practice to mark such areas with brightly colored tape, so that the customer will be alerted to to remove the product that has the spliced area thereon after it is wrapped.

Certainly, customers would prefer to have packaging material that does not include such imperfections. If manufacturers were to discard each roll of material that has an imperfection, however, the cost of packaging material would be made prohibitively high.

It is clear that a need exists in this area of technology for an improved method and apparatus for removing defective areas in a printed polymeric web that is capable of efficiently removing the defective areas, re-registering the two ends, and splicing the web in a manner that is sufficiently strong and invisible to the customer that the customer can package its product without interruption.

SUMMARY OF THE INVENTION

Accordingly, it is an object of the invention to provide an improved method and apparatus for removing defective areas in a printed polymeric web that is capable of efficiently removing the defective areas, re-registering the two ends, and splicing the web in a manner that is sufficiently strong and invisible to the customer that the customer can package its product without interruption.

In order to achieve the above and other objects of the invention, an apparatus for removing defective portions from a polymeric web such as that which is used for packaging consumer absorbent paper products includes a frame; a welding assembly mounted on the frame for welding two overlapping portions of polymeric web material together in a predetermined registration position by forming a weld line at which the two overlapping portions are fused; a cutting assembly mounted on the frame for cutting the overlapping portions along a path that is substantially coincident with the weld line, whereby a seamless splice is created between the two overlapping portions; a clamping assembly for clamping overlapping portions in the predetermined registration position prior to operation of the welding assembly and the cutting assembly; and a portable support assembly for portably supporting the frame, and thereby the welding assembly, the cutting assembly and the clamping assembly for convenient movement, whereby the apparatus can be moved in and out of position in a production line quickly and conveniently.

According to a second aspect to the invention, an apparatus for forming a near-seamless splice between a first polymeric web portion and a second polymeric web portion includes a frame; a clamping assembly for clamping the first polymeric web portion and the second polymeric web portion in a desired position of registration; and a combined welding and cutting assembly for simultaneously (a) welding the two web portions together by forming a weld line at which the two web portions are fused; and (b) cutting through the two web portions at the weld line, whereby a seamless splice is created between the two web portions.

According to a third aspect of the invention, a method of removing defective portions from a printed polymeric web having a repeating pattern thereon such as that which is used for packaging consumer paper products, wherein step (e) can be preformed at the same time or after step (d); includes steps of (a) identifying a defective portion of the printed polymeric web, thereby defining a feed end portion and a takeup end portion of the printed web to be spliced; (b) overlapping the feed end portion with respect to the takeup end portion in an inverted relationship so that like surfaces of the feed end portion of the printed web and the takeup end of the printed are positioned facing each other; (c) securing the overlapped feed end portion and takeup end portions in a position of registration in which the regular spacing of the repeating pattern is preserved from the feed end portion to the takeup end portion; (d) welding the secured feed end and takeup end portions together by forming a weld line at which the two portions are fused; and (e) cutting through the two web portions at the weld line, whereby the defective portion is cut out of the web and a nearly seamless, registered splice is created between the takeup end portion and the feed end portion.

According to a fourth aspect of the invention, a method of removing defective portion from a printed polymeric web having a repeating pattern thereon such as that which is used for packaging consumer paper products, wherein step (e) can be preformed at the same time or after step (d), includes steps of: (a) moving a portable splicing unit into a position in a production line for a printed polymeric web that is convenient for removing a defective portion of the web; (b) overlapping a feed end portion of the printed web with respect to a takeup end portion in an inverted relationship so that like surfaces of the feed end portion of the printed web and the takeup end of the printed web are positioned facing each other; (c) securing the overlapped feed end portion and takeup end portions in a position of registration in which the regular spacing of the repeating pattern is preserved from the feed end portion to the takeup end portion; (d) welding the secured feed end and takeup end portions together by forming a weld line at which the two portions are fused; and (e) cutting through the two web portions at the weld line, whereby the defective portion is removed and a nearly seamless, registered splice is created between the takeup end portion and the feed end portion.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 4 is a fragmentary end view of an interaction between two components in the apparatus that is depicted in FIGS. 1–3;

FIG. 5 is a fragmentary side view of the interaction that is depicted in FIG. 4;

FIG. 6 is a magnified view of the interaction that is depicted in FIG. 5;

FIG. 7C is a diagrammatical view depicting a third step of the process that is shown in FIGS. 7A and 7B;

FIG. 7D is a diagrammatical view depicting a fourth step in the process that is shown in FIGS. 7A–7C; and FIG. 7E is a diagrammatical view depicting a fifth step in a process that is shown in FIGS. 7A–7D.

DETAILED DESCRIPTION OF THE PREFERRED EMBODIMENT(S)

Figure 1:
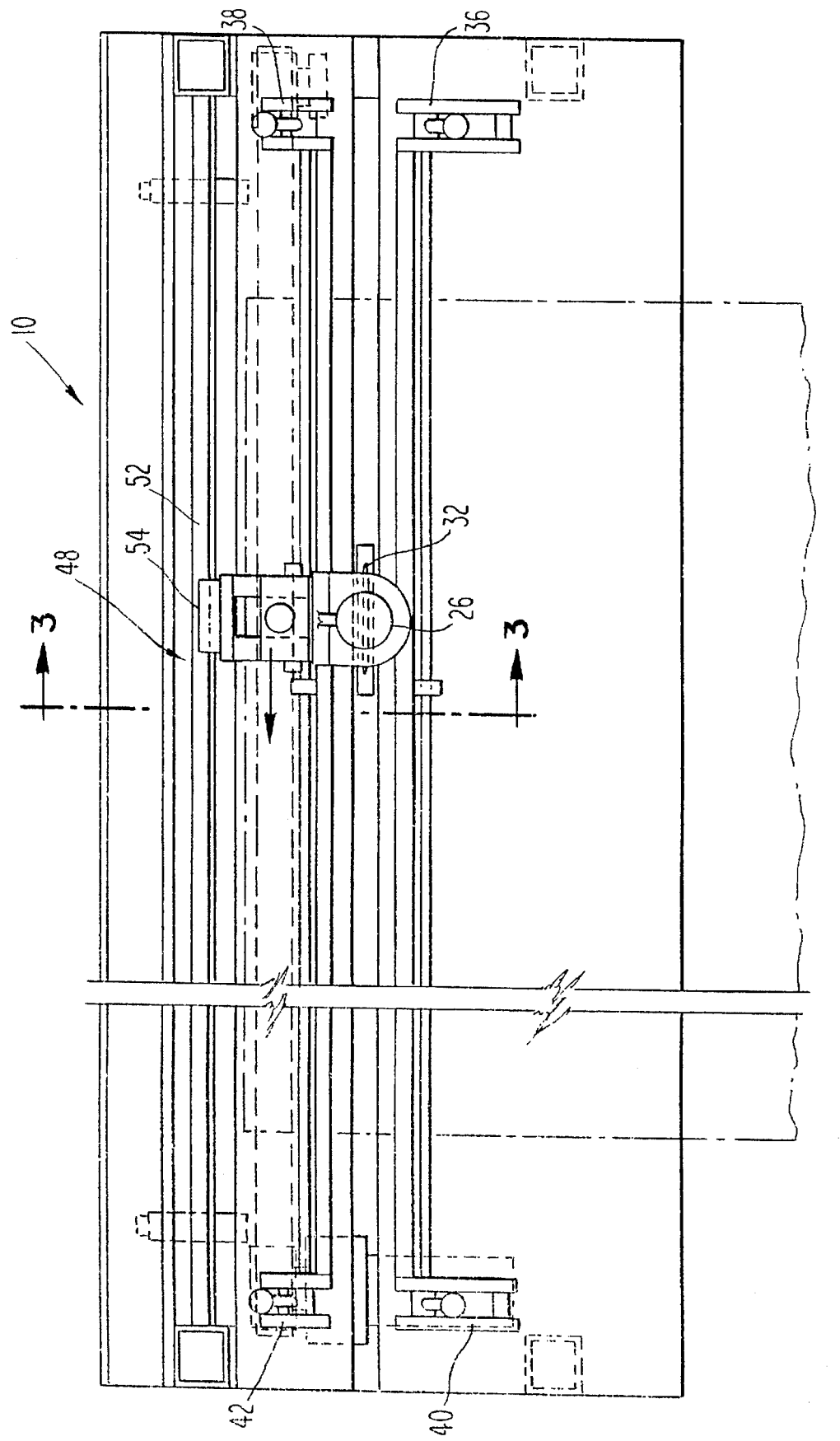
FIG. 1 is a top plan view of an apparatus which is constructed according to a preferred embodiment of the invention.
Figure 2:
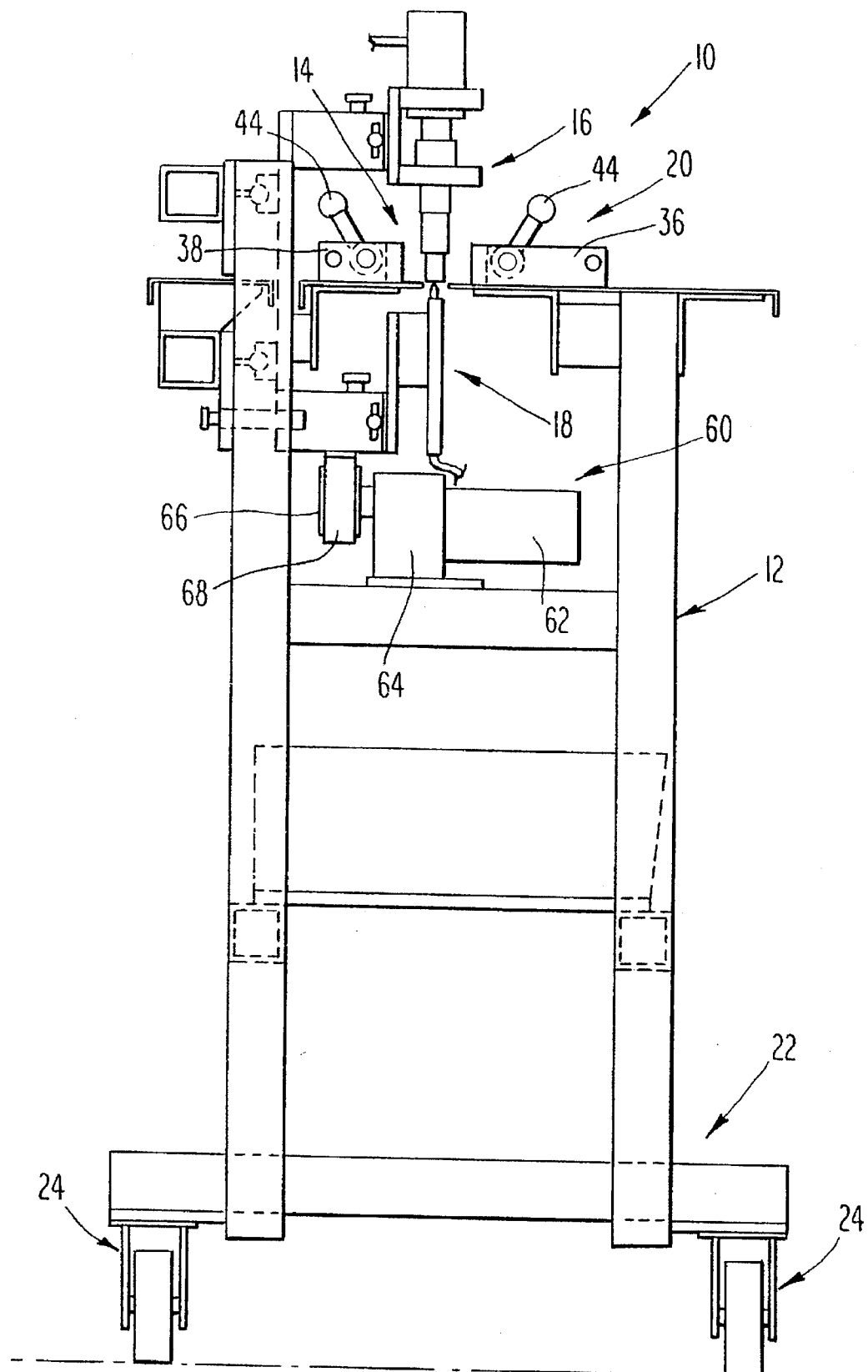
FIG. 2 is a left side elevational view of the apparatus that is depicted in FIG. 1.
Figure 3:
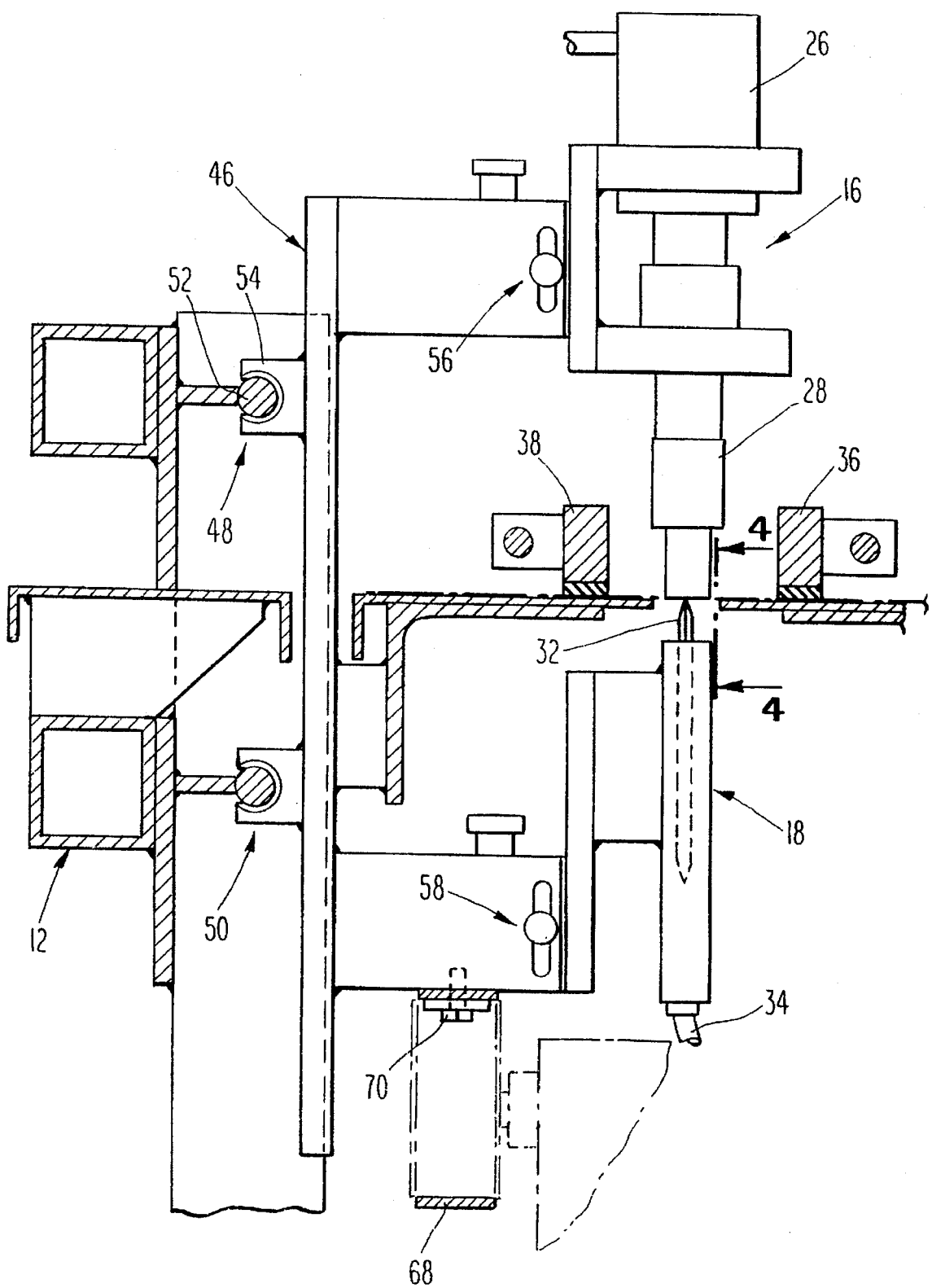
FIG. 3 is a cross-sectional view taken along lines 3—3 in FIG. 1.

Referring now to the drawings, wherein like reference numerals designate corresponding structure throughout the views, and referring in particular to FIGS. 1–3, an improved apparatus 10 for removing defective portions from a polymeric web such as that which is used for packaging consumer absorbent paper products includes a frame 12, and a combined welding and cutting assembly 14 that includes a welding assembly 16, a cutting assembly 18 and a clamping assembly 20. Apparatus 10, according to one advantageous feature of the invention, further includes a portable support assembly 22 that is, in the preferred embodiment, provided as a number of wheels 24 that are mounted to a lower end of support frame 12.

As may best be seen in FIGS. 2 and 3, welding assembly 16 includes an ultrasonic transducer 26 that is coupled to an ultrasonic horn 28. Ultrasonic horn 28, as may be seen in FIG. 3, has a flat lower surface which is positioned slightly above a gap that is defined in a horizontal support surface 30 that is formed on support frame 12.

Cutting assembly 18, as may also be seen in FIG. 3, includes a rotary cutting knife 32 that is positioned directly beneath the ultrasonic horn 28 and the gap which is defined in support surface 30 so as to be positioned in opposition to ultrasonic horn 28. In operation, cutting knife 32 operates as an anvil in opposition to the ultrasonic horn 28. The edge of cutting knife 32 is preferably ground flat so that a flat surface having a width within a range of approximately 0.020 to 0.080 inches presented versus ultrasonic horn 28. The most preferred width is approximately 0.0625 inches, or $\frac{1}{16}$th of an inch. Cutting knife 32 is pneumatically biased toward ultrasonic horn 28, by means of a pneumatic piston-cylinder arrangement that is common in this area of technology. FIG. 3 depicts a pneumatic hose 34, which is used to communicate a pneumatic pressure to the piston cylinder arrangement. A desired pressure may be maintained in the piston-cylinder by a regulator or equivalent device.

Referring briefly to FIG. 1, clamping assembly 20 includes, in the preferred embodiment, a first clamp 36, a second clamp 38, a third clamp 40, and a fourth clamp 42. First and second clamps 36, 38 are visible in FIGS. 2 and 3. In the preferred embodiment, first clamp 36 is coupled so as to operate as a unit with third clamp 40, and second clamp 38 is connected so as to be operable together with fourth clamp 42. Clamps 36, 38, 40, 42 are, in the preferred embodiment, manually operated by means of a handle 44 which is provided on each of the respective clamps. Handle 44 actuates clamps 36, 38, 40, 42 through a conventional over-center cam actuation arrangement, which is common in clamps and other work holders.

Referring now to FIGS. 2 and 3, it will be seen that combined welding and cutting assembly 14 is moveable as a unit with respect to frame 12 by means of a support carriage 46, on which both welding assembly 16 and cutting assembly 18 are mounted. In the preferred embodiment, support carriage 46 is moveable with respect to frame 12 in a horizontal plane that is defined by the pitch of a first slide bearing 48 and a second slide bearing 50, best shown in FIG. 3. Each slide bearing 48, 50 includes, in the preferred embodiment, a smooth rail 52 that is connected to frame 12 and a number of sleeve pillows 54 that receive the respective rail 52 in the relationship that is depicted in FIG. 3. As is also shown in FIG. 3, the vertical position of welding assembly 16 can be adjusted with respect to support carriage 46 by means of a position adjustment 56 that is, in the preferred embodiment, a bolt and slot arrangement. A similar bolt and slot arrangement 58 is provide to permit vertical adjustment of cutting assembly 18 with respect to support carriage 56.

Apparatus 10 further includes a carriage drive mechanism 60 for driving the support carriage 46 across a web with respect to support frame 12. As is best shown in FIGS. 2 and 3, carriage drive mechanism 60 includes an electric motor 62, which is coupled to a drive pulley 66 via a gear reduction box 64. An endless belt 68 is supported on drive pulley 66, and on a second drive pulley that is visible in FIG. 1. A bolt 70 connects an upper run of belt 68 with support carriage 46. Accordingly, when motor 62 drives pulley 66 in a first direction, support carriage 46, along with the welding assembly 16 and cutting assembly 18 mounted thereon will move in a first direction with respect to frame 12, which will be toward or away from a viewer of FIG. 3. When motor 62 turns in the opposite direction, support carriage 46 will be driven, accordingly, in a second direction that is opposite from the first direction.

Figure 7A:
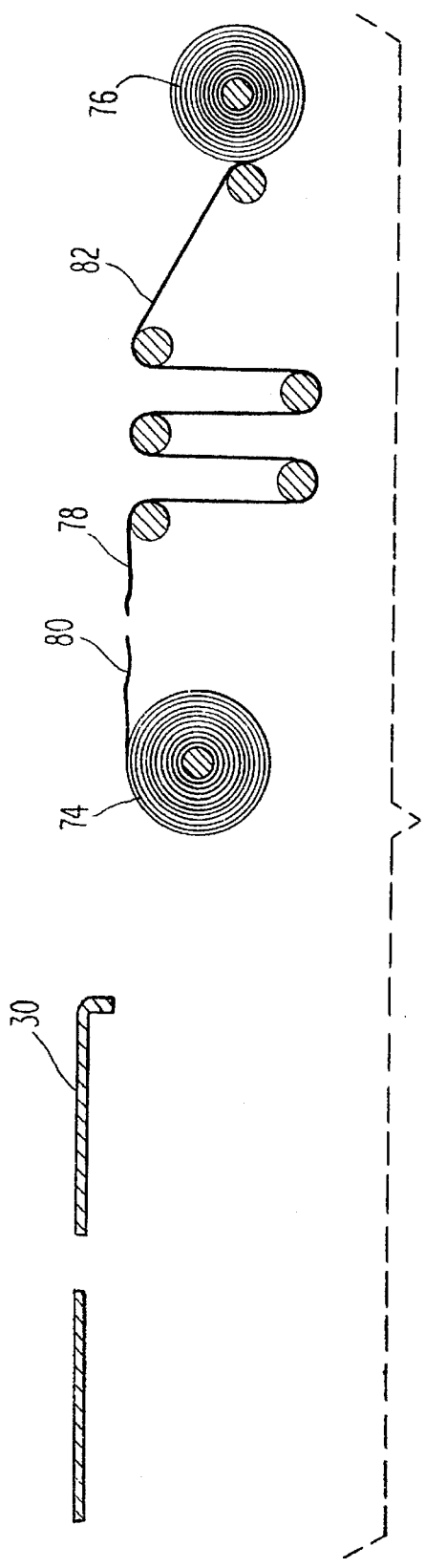
FIG. 7A is a diagrammatical view depicting a first step of an improved process according to a preferred embodiment of the invention.

A method according to a preferred embodiment of the invention will now be discussed. A manufacturer or printer of a printed polymeric web that has a repeating pattern thereon will typically inspect the web after printing for defects. This inspection may take place as the web is wound from a feed roll 74 to a takeup roll 76, as is shown in FIG. 7A. Alternatively, this inspection may take place as the web proceeds from a printing press directly to a takeup roll 76.

Figure 7B:
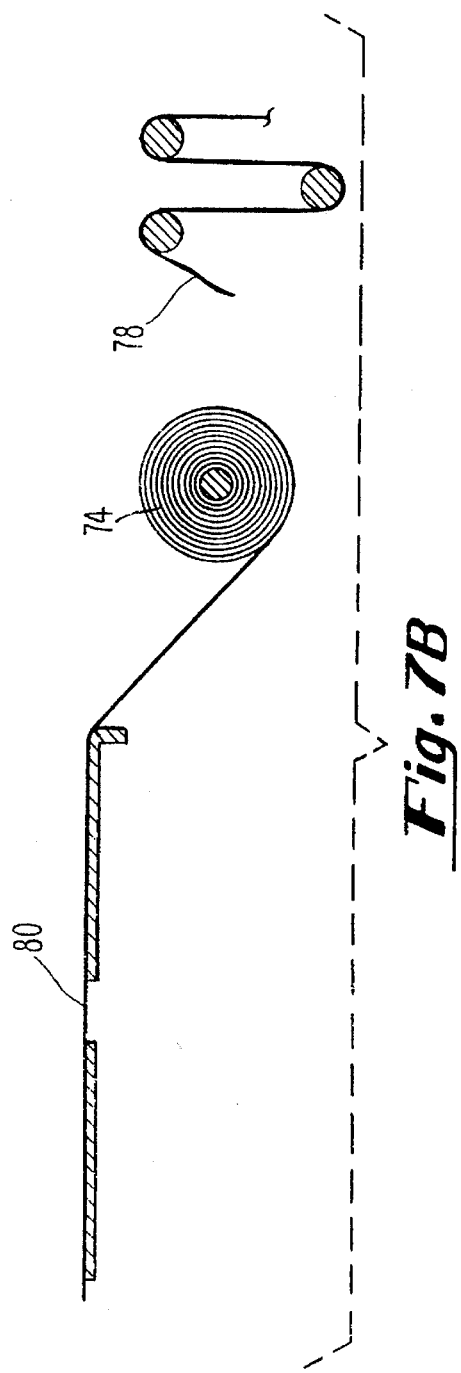
FIG. 7B is a diagrammatical view depicting a second step of the process shown in FIG. 7A.

When a defective area is identified, the web is stopped, and the portable apparatus 10 is wheeled into alignment with the web by pushing the apparatus 10 on the portable support assembly 22, which is, in the preferred embodiment, wheels 24. At this point, a feed end portion 80 of the web may be severed from a takeup end portion 82 in an area around the defective portion 78, although this is not absolutely necessary. This step is depicted in FIG. 7A. At this point, the feed end portion 80 of the web is pulled onto the support surface 30 of apparatus 10, as is shown in FIG. 7B. It is to be noted that the surface of the feed end portion 80 that originally was the top surface, as viewed in FIG. 7A, is positioned facing downwardly, toward the support surface 30 during this step.

Next, the takeup end portion 82, which, in this example, includes the defective portion 78, is also positioned above support surface 30, and also above the feed end portion 80 of the web. It is to be noted that the original top side portion of the takeup end portion 82 remains facing upwardly, so that the bottom surfaces of the feed end portion 80 and the takeup end portion 82 are facing each other. Alternatively, the end portions 80, 82 could be arranged so that the top sides are facing each other. It is important, for reasons that will become apparent shortly, that like surfaces, e.g. top and top or bottom and bottom, face each other during the subsequently described welding and cutting steps.

At this point, an operator will also carefully register the takeup end portion 82 with the feed end portion 80 so that the repeating printing pattern on the web will be preserved after splicing and cutting. It is especially important that the operator perform this step, so that the pattern will continue to repeat at regular distant intervals through the splice area.

The operator will than clamp the portions 82, 80 onto the support surface 30 by using the manual clamping assembly 20, as is depicted in FIG. 7C.

The operator will then actuate the carriage drive mechanism 60, causing motor 62 to drive, via reduction box 64, pulley 66 and belt 78, support carriage 46, and thus combined welding and cutting assembly 14, transversly across the clamped web portions 80, 82. FIGS. 4–6 depict the interaction between the web portions 80, 82, the ultrasonic horn 28, and the cutting knife 32 during this process. As is best shown in FIG. 6 a weld line 72 is formed around the point of contact between ultrasonic horn 28 and cutting knife 32. The cutting knife 32 simultaneously severs the web portions 80, 82 at the weld line 72, creating virtually invisible weld beads between the top and bottom layers of polymeric web on each side of the cutting knife 32, as it is viewed in FIG. 6. As may be seen in FIG. 7E, this results in a virtually indistinguishable splice between the feed end portion 80 and the takeup end portion 82, thus forming a spliced web 84 that can be used by the customer without interrupting the packaging process. The severed portion 86 of the feed end portion 80 and the defective portion 78, shown positioned to the left in FIGS. 6 and 7E, is than disposed of. At this point, it will become evident that it is not absolutely necessary to sever the web as is shown in FIG. 7A in order to perform the splicing process. If the web is not severed a single loop of material may be drawn through the apparatus 10, registered, and then clamped on to the support surface 32 in order to achieve same results.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of removing defective portions from a printed polymeric web having a repeating pattern thereon such as that which is used for packaging consumer paper products, comprising:

(a) identifying a defective portion of the printed polymeric web, thereby defining a feed end portion and a takeup end portion of the printed web to be spliced;

(b) overlapping the feed end portion with respect to the takeup end portion in an inverted relationship so that like surfaces of the feed end portion of said printed web and said takeup end of said printed web are positioned facing each other;

(c) securing said overlapped feed end portion and takeup end portions in a position of registration in which the regular spacing of the repeating pattern is preserved from the feed end portion to the takeup end portion;

(d) welding the secured feed end and takeup end portions together by forming a weld line at which the two portions are fused; and (e) substantially simultaneously with step (d), cutting through said two web portions at the weld line, whereby the defective portion is cut out of the web and a nearly seamless, registered splice is created between the takeup end portion and the feed end portion.

2. A method according to claim 1, wherein step (d) is performed by subjecting the web portions to ultrasonic vibration.

3. A method according to claim 1, wherein steps (d) and (e) are performed by compressing the secured web portions between a cutting knife and an ultrasonic horn.

4. A method according to claim 1, wherein steps (d) and (e) are performed substantially simultaneously by compressing the secured web portions between a cutting knife and a welding tool.

5. A method of removing defective portions from a printed polymeric web having a repeating pattern thereon such as that which is used for packaging consumer paper products, comprising:

(a) moving a portable splicing unit into a position in a production line for a printed polymeric web that is convenient for removing a defective portion of the web;

(b) overlapping a feed end portion of the printed web with respect to a takeup end portion in an inverted relationship so that like surfaces of the feed end portion of said printed web and said takeup end of said printed web are positioned facing each other;

(c) securing said overlapped feed end portion and takeup end portions in a position of registration in which the regular spacing of the repeating pattern is preserved from the feed end portion to the takeup end portion;

(d) welding the secured feed end and takeup end portions together by forming a weld line at which the two portions are fused; and (e) substantially simultaneously with step (d), cutting through said two web portions at the weld line, whereby the defective portion is removed and a nearly seamless, registered splice is created between the takeup end portion and the feed end portion.

6. A method according to claim 5, wherein step (d) is performed by subjecting the web portions to ultrasonic vibration.

7. A method according to claim 5, wherein steps (d) and (e) are performed by compressing the secured web portions between a cutting knife and an ultrasonic horn.

8. A method according to claim 5, wherein steps (d) and (e) are performed by compressing the secured web portions between a cutting knife and a welding tool.

9. A method of a removing defective portion from a printed polymeric web having a repeating pattern thereon such as that which is used for packaging consumer paper products, comprising:

(a) identifying a defective portion of the printed polymeric web, thereby defining a feed end portion and a takeup end portion of the printed web to be spliced;

(b) overlapping the feed end portion with respect to the takeup end portion in an inverted relationship so that like surfaces of the feed end portion of the printed web and the takeup end portion of the printed web are positioned facing each other;

(c) securing the overlapped feed end portion and takeup end portions in a position of registration in which the regular spacing of the repeating pattern is preserved from the feed end portion to the takeup end portion;

(d) ultrasonically welding the feed end and takeup end portions together by forming a weld line at which the two portions are fused with an ultrasonic tool; and (e) using a rotary cutting tool that cooperates with the ultrasonic tool to cut through the two web portions at the weld line, whereby the defective portion is cut out of the web and a nearly seamless, registered splice is created between the takeup end portion and the feed end portion.

10. A method removing a defective portion from a printed polymeric web having a repeating pattern thereon such as that which is used for packaging consumer paper products, comprising:

(a) moving a portable splicing unit into a position in a production line for a printed polymeric web that is convenient for removing a defective portion of the web;

(b) overlapping a feed end portion of the printed web with respect to a takeup end portion in an inverted relationship so that like surfaces of the feed end portion of the printed web and the takeup end of the printed web are positioned facing each other;

(c) securing the overlapped feed end portion and takeup end portions in a position of registration in which the regular spacing of the repeating pattern is preserved from the feed end portion to the takeup end portion;

(d) using an ultrasonic tool to weld the secured feed end and takeup portions together by forming a weld line at which the two portions are fused; and (e) using a rotary tool that cooperates with the ultrasonic tool to cut through the two web portions at the weld line, whereby the defective portion is removed in a nearly seamless, registered splice is created between the takeup end portion and the feed end portion.

* * * * *

UNITED STATES PATENT AND TRADEMARK OFFICE
CERTIFICATE OF CORRECTION

PATENT NO. : 5,632,831
DATED : May 27, 1997
INVENTOR(S) : Robert Stull

It is certified that error appears in the above-indentified patent and that said Letters Patent is hereby corrected as shown below:

Column 1, Line 30, delete "sliced together" and insert --spliced together-- therefor.

Column 2, Line 32, delete "of the printed are" and insert --of the printed web are-- therefor.

Column 5, Lines 52-53, delete "is than disposed of." and insert --is then disposed of.-- therefor.

Column 7, Line 4, delete "A method of a removing defective" and insert --A method of removing a defective-- therefor.

Column 8, line 1, delete "A method removing a" and insert --A method of removing a-- therefor.

Signed and Sealed this

Twenty-third Day of December, 1997

Attest:

Attesting Officer

BRUCE LEHMAN
Commissioner of Patents and Trademarks